(12) United States Patent
Nasco, Sr.

(10) Patent No.: US 6,708,705 B2
(45) Date of Patent: Mar. 23, 2004

(54) BRAKING CANE

(76) Inventor: Mike Nasco, Sr., 7842 E. Northland Dr., Scottsdale, AZ (US) 85251

( * ) Notice: Subject to any disclaimer, the term of this patent is extended or adjusted under 35 U.S.C. 154(b) by 0 days.

(21) Appl. No.: 10/025,231

(22) Filed: Dec. 19, 2001

(65) Prior Publication Data

US 2003/0205265 A1 Nov. 6, 2003

(51) Int. Cl.$^7$ .................................................. A45B 1/02
(52) U.S. Cl. ............................ 135/85; 135/66; 135/77; 280/47.34; 280/62; 188/29
(58) Field of Search .................... 135/65, 66, 85, 135/912, 77; 188/29, 19, 1.12; 280/47.34, 87.041, 14.28, 62–63

(56) References Cited

U.S. PATENT DOCUMENTS

| | | | |
|---|---|---|---|
| 1,494,508 A | * 5/1924 | Smith | 135/85 |
| 4,018,440 A | * 4/1977 | Deutsch | 482/68 |
| 4,261,561 A | * 4/1981 | Ilon | 482/68 |
| 4,559,962 A | * 12/1985 | Marchiano | 135/85 |
| 4,962,781 A | * 10/1990 | Kanbar | 135/65 |
| 5,020,560 A | * 6/1991 | Turbeville | 135/67 |
| 5,046,748 A | 9/1991 | Oat-Judge | |
| 5,479,953 A | 1/1996 | Pasulka | |
| 5,588,457 A | 12/1996 | Tartaglia | |
| 5,603,517 A | 2/1997 | Lorman | |
| 5,636,651 A | 6/1997 | Einbinder | |
| 5,692,533 A | 12/1997 | Meltzer | |
| 5,694,959 A | 12/1997 | Hiller et al. | |
| 5,704,577 A | 1/1998 | Gordon | |
| 5,716,063 A | 2/1998 | Doyle et al. | |
| 5,794,639 A | 8/1998 | Einbinder | |
| D401,541 S | 11/1998 | Ahlbertz | |
| 5,865,065 A | 2/1999 | Chiu | |
| 5,896,779 A | 4/1999 | Biersteker et al. | |
| 5,938,240 A | 8/1999 | Gairdner | |
| 5,975,100 A | 11/1999 | Sfeir | |
| 6,032,765 A | 3/2000 | Hsi-Chia | |
| 6,098,487 A | 8/2000 | Chien | |
| 6,158,453 A | 12/2000 | Nasco | |
| 6,202,502 B1 | 3/2001 | Chung-Che | |
| 6,342,032 B1 | * 1/2002 | Affield | 482/74 |
| 6,435,529 B1 | * 8/2002 | Stewart et al. | 280/87.041 |

FOREIGN PATENT DOCUMENTS

JP    9-140424    * 6/1997

* cited by examiner

*Primary Examiner*—Winnie S. Yip
(74) *Attorney, Agent, or Firm*—Jones, Waldo, Holbrook & McDonough; Brent T. Winder

(57) ABSTRACT

There is a walking cane, for supporting and balancing a user, and allowing a user to retard forward motion. The walking cane includes a base, having a wheel rotatably coupled thereto. The cane further includes a braking member, coupled to and positioned relatively above the base, having a contact portion that contacts the wheel to retard the wheel's rotation when a threshold downward force is applied to the cane.

20 Claims, 3 Drawing Sheets

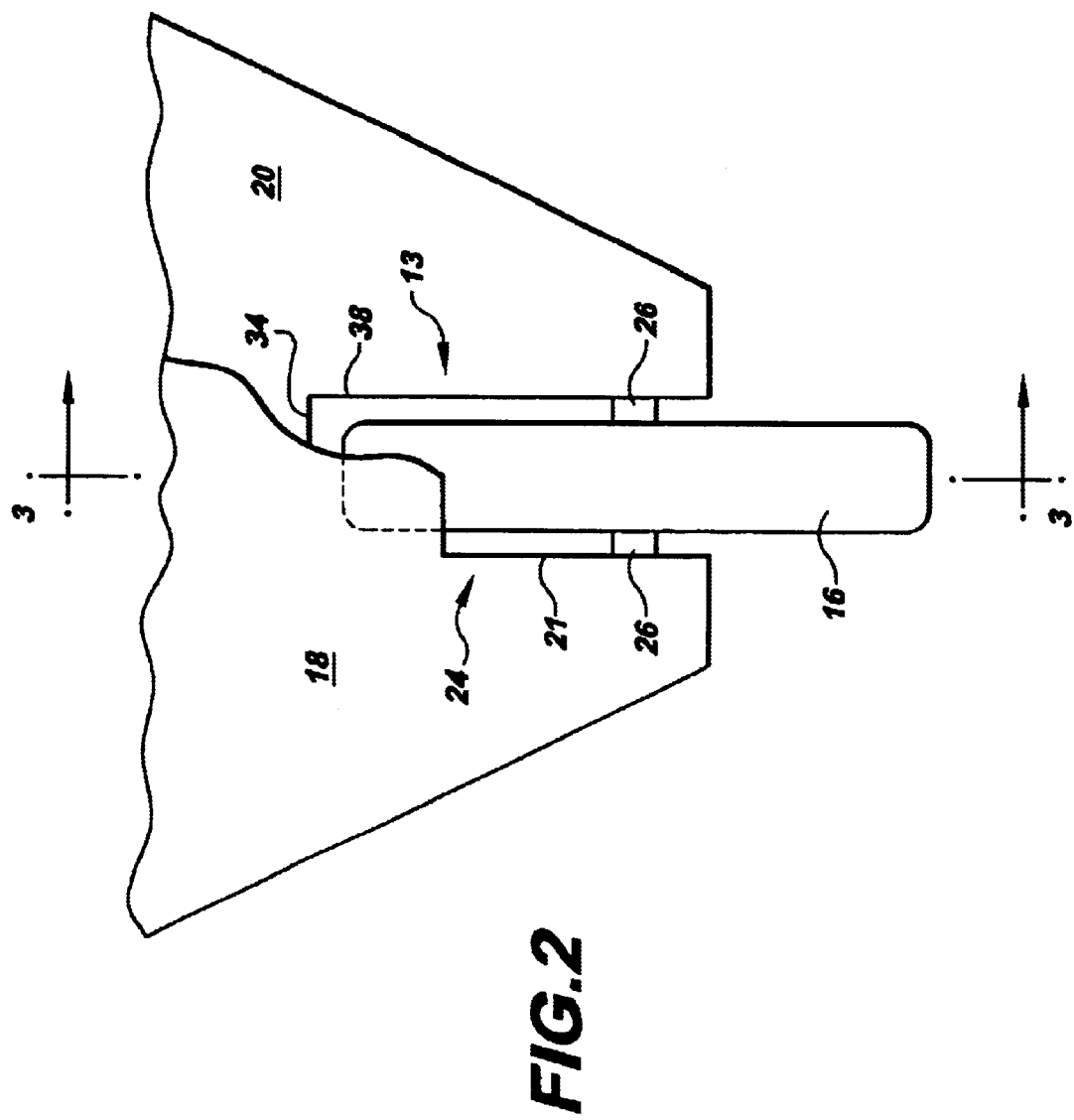

BRAKING CANE

FIELD OF THE INVENTION

A walking cane having wheels that utilizes an improved braking system.

BACKGROUND

Walking canes are widely used to assist aged and infirm individuals in maintaining balance, as well as to provide support. Typically, a walking cane includes an elongate shaft having a handle on one end, and some sort of support base on the other end. The support base is frequently just the end of the elongate shaft with a cushion tip made of rubber or some other high resistance material.

By broadening the support base, greater stability is imparted to the cane, and thus to the user. However, in broadening the support base, there is a resultant increase in the overall mass of the cane. This mass can make maneuvering the walking cane very cumbersome particularly to aged or infirm individuals. Therefore, a walking cane that provides the added support of a broader base, but is relatively easy for the user to maneuver, would be advantageous.

Additionally, there are available a variety of walkers and canes that are capable of braking under various circumstances. Such braking availability is advantageous, particularly in canes having wheeled motion. For example, if a user is falling, a braking system can stop forward motion of the support base, thus allowing the user to support himself on the cane while regaining his footing. However, in designing a braking system, an important consideration is the complexity of installing the system, and the ease of use. Highly complex braking systems add considerable manufacturing expense that is passed on to the consumer in higher prices. Additionally, complex braking systems may require considerable strength to actuate. For example, a hand-actuated braking system requires a certain threshold of pressure be applied, by the user's hand, to the brake handle. Since walking aids are primarily used by aged and infirm individuals, a braking system that requires significant physical exertion would not be suitable. Therefore, a walking cane having a braking system that is simple to install and relatively easy to actuate would be advantageous.

A number of prior patents disclose walking aids, some of which include braking systems. Examples of these patents, each of which is incorporated by reference for its supporting teachings, are as follows:

U.S. Pat. No. 5,479,953 to Pasulka discloses a walker cart for an ambulatory patient that includes a telescoping rod with a holder at the top end of the rod for holding one or more intravenous solution bags to which the patient is connected, and frame members to which infusion pump elements may be connected for the patient. The cart includes caster wheels for maneuvering the cart and handle elements which may be grasped by the ambulatory patient in several different ways, according to the desiderata or capability of the ambulatory patient.

U.S. Pat. No. 5,588,457 to Tartaglia discloses a useful cane assembly for the handicapped for walking and maneuvering with ease, having the person's weight on the cane assembly being continuously supported. The cane is supported by a base which is on wheels.

U.S. Pat. No. 5,636,651 to Einbinder discloses a controller for wheeled vehicles that includes a mechanism which selectively shifts the vehicle between a mobile and a stable state. The vehicle may be a walker for easing an operator's efforts in walking and includes a selectively actuable stabilizer which fixes the position of the walker or releases it for rolling motion, thus providing a stable state or a mobile state, respectively. An actuator such as a button, pressure sensor, or lever, electrically and/or mechanically actuates a stabilizer brake mechanism to engage or release the brake and thereby allow the walker's mobility to be controlled when the actuator operates the brake to stabilize or to slow the motion of the walker. Preferably, lift applied to the vehicle itself releases the brake and allows mobility. The actuator may control an electrically actuated braking mechanism, in response to a sensor such as a strain gauge that may be adjusted to the needs of the patient; alternatively, lifters may be provided to act in response to the lifting force.

U.S. Pat. No. 5,694,959 to Hiller et al. discloses a removable tray for a walker including a walker having a pair of spaced upper side bars. Further provided are a pair of walker coupling mechanisms adapted to be coupled to an associated side bar of the walker via clamps. A tray is slidably coupled to the walker coupling mechanism such that only lateral relative movement is allowed prior to use. Finally, at least one flexible strip is coupled at a first end thereof to the tray for coupling about at least one of the side bars of the walker to preclude lateral movement of the tray during use.

U.S. Pat. No. 5,704,577 to Gordon discloses a coupler made from cylindrical tubing that has elastically deformable ends. Each end has a bifurcation. The bifurcations are mutually perpendicular. One of the bifurcations has a walker coupling location with an orthogonal projection that includes an arc of a circle that has a diameter substantially equal to the diameter of a cylindrical horizontal member of a walker. The other of the bifurcations has an IV stand coupler location with an orthogonal projection that includes an arc of a circle that has a diameter substantially equal to the diameter of a cylindrical member of an IV stand.

U.S. Pat. No. 5,794,639 to Einbinder discloses a controller for wheeled vehicles that includes a mechanism which selectively shifts the vehicle between a mobile and a stable state. The vehicle may be a walker for easing an operator's efforts in walking and includes a selectively actuable stabilizer which fixes the position of the walker or releases it for rolling motion, thus providing a stable state or a mobile state, respectively. An actuator such as a button, pressure sensor, or lever, electrically and/or mechanically actuates a stabilizer brake mechanism to engage or release the brake and thereby allow the walker's mobility to be controlled when the actuator operates the brake to stabilize or to slow the motion of the walker. Preferably, lift applied to the vehicle itself releases the brake and allows mobility. The actuator may control an electrically actuated braking mechanism, in response to a sensor such as a strain gauge that may be adjusted to the needs of the patient; alternatively, lifters may be provided to act in response to the lifting force.

U.S. Pat. No. 5,938,240 to Gairdner discloses a device used by a skater for controlling speed and maintaining balance on wheeled skates. The device includes a molded elongate body with a fork for receiving a wheel at one end and a hand grip at the other end. The body includes a brake assembly for applying a braking force to the wheel or to the ground. The invention also relates to a brake pad and a wheel having corresponding tongues and grooves for frictional contact. The invention also relates to a method for learning to skate using the control device.

U.S. Pat. No. 5,975,100 to Sfeir discloses a vibrational walking apparatus including a frame having flexible projections capable of detecting obstructions to the front or sides of the user. Width projections can extend laterally from the frame to detect a predetermined width of the user. The apparatus can include a height sensor to determine if an object will contact the upper extremities of the user. A vibrator located adjacent a handle is activated by switches coupled to the flexible projections and height sensor in order to provide a different vibrational frequency to the handle when one of the respective flexible projections or height sensor is activated.

U.S. Pat. No. 6,098,487 to Chien discloses a hand brake that includes a mounting frame mounted on a handlebar grip of a wheeled walker and defining a working space with an open side and a closed end wall. A cable pull block is disposed inside the working space, and has an upper part pivoted to the mounting frame by a first pivot, and a lower part serving as a force bearing part and connected to a transmission cable under tension. A control lever has a pivot part extending into the working space via the open side thereof, and an operating part extending outwardly of the working space. The pivot part has an upper portion that is provided with an upwardly opening accommodating space. The accommodating space has a base wall. The cable pull block extends downwardly into the accommodating space such that the lower part confronts the base wall. The lower part of the control lever is pivoted to the cable pull block by a second pivot parallel to and disposed below the first pivot. The control lever is operable from a non-braking state to a braking state, where the cable pull block is pivoted by the control lever about the first pivot to apply a pulling force to the transmission cable.

U.S. Pat. No. 6,202,502 B1 to Chung-Che discloses a brake mechanism for an auxiliary walker that has a fixed seat, a control plate and a hand grip. The fixed seat is hollow at an inner portion of a handle at one top end thereof. The control plate has formed horizontal guide hole at bottom one side and further formed a fixed hole at bottom one surface. The hand grip is provided with a long trough hole at one end thereof providing the control plate to insert in. The control plate together with said hand grip are all be inserted into the fixed seat fastening by plurality screws at the top end of control plate and fixed seat.

U.S. Pat. No. Des. 401,541 to Ahlbertz discloses an ornamental design for a brake handle for a walker.

U.S. Pat. No. 5,046,748 to Oat-Judge discloses a walker that has a basket, a handle for use in pushing the walker along an upwardly facing surface and a plurality of legs connected to the basket and to the handle. The legs have lower ends, and a wheel and a braking element are associated with the lower end of each leg. A braking mechanism is provided for automatically actuating the braking elements and causing same to engage the upwardly facing surface if a predetermined weight is applied to the handle or to the basket, thus to stop the walker. The walker also has a manually operable brake system whereby the user can deliberately bring the walker to a stop.

U.S. Pat. No. 5,603,517 to Lorman discloses a rollable walker for traversing stairs and substantially level surfaces, comprising a frame which includes a left and a right upright members, the left and right upright members including front legs, and an upper segment. The frame further includes a crossbar which is pivotaly connected to the left and a right upright members, the crossbar including a generally U-shaped transverse element and vertically disposed segments acting as rear legs. The crossbar is supported by supporting means. The supporting means is attached or integrally formed with the left and right upright members. A pair of rear wheels and a pair of front wheels engaged by wheel mounts, each wheel having two vertical planar surfaces. The rear wheels are connected to the rear legs, whereas the front wheels are connected to the front legs. The vertical planar surfaces of the wheels are surrounded by protrusions; and, two pairs of braking devices connected to the rear and front legs, each of the braking devices is slidably supported by one of the wheel mounts over one of the wheels in such a way that the application on the frame of a downward force of a magnitude greater than a predetermined value urges the braking devices against the wheels to brake the walker.

U.S. Pat. No. 5,716,063 to Doyle et al. discloses a walking aid for physically challenged persons having front and back leg assemblies each having a front leg extending forwardly and a rear leg extending rearwardly and wheels at the lower ends of the legs, and modular hinges at the upper ends of each pair of legs. Each modular hinge has a bearing housing with bearing recesses, two bearing bodies, each bearing body being received in a respective recess. Each bearing body is interengagable with a respective front or rear leg, and, a transverse assembly bar is connected to the hinge mounting and secures the hinges in spaced apart side by side relation. Also disclosed is a brake locking system for an in-line two part brake handle, and a multi-use seat for a walker.

U.S. Pat. No. 5,865,065 to Chiu discloses a hand brake that includes a main frame fixedly mounted on a handlebar of the walker, a control lever pivotally connected to the main frame, a brake member pivotally connected to the control lever to locate in a working space of the control lever, and a steel cable connected to the brake member. With changes in positions of the control lever, the brake member is caused to change its position in the working space of the control lever to pull the steel cable and thereby to either brake the wheeled walker, to brake and park the wheeled walker, or to return the walker to a non-brake state.

U.S. Pat. No. 5,896,779 to Biersteker et al. discloses a manually operated brake actuator for a wheeled walker and the like. For normal braking, a handle is manually moved from a neutral first position towards a second position for rotating a cable link to progressively pull on a brake cable to engage a wheel brake. When the handle is released, it returns to the first position. When the handle is manually moved from the first position to a third position, a parking link is rotated to push on and rotate the cable link to engage the brake. The parking link is rotated to a stable position when the handle is in the third position, wherein pull on the brake cable cannot release the brake until the handle is manually moved back to the first position.

U.S. Pat. No. 6,032,765 to Hsi-Chia discloses a brake control device that is mounted on a handle of a walking frame used by a lame or elderly person as an aid in walking. The device includes a seat fastened at one end thereof with the handle, and a control handlebar fastened at one end thereof with the seat. The seat is provided with a control arm and a stop member. The control arm is fastened with the control handlebar and is connected with one end of a brake cable. The control arm is actuated by the control handlebar to swivel so as to pull the brake cable to bring about the braking action which can be sustained without having to keep holding the control handlebar. The control handlebar is made stationary temporarily by a rolling rod which is forced into a retaining recess of the stop member for sustaining the braking action.

U.S. Pat. No. 5,692,533 to Meltzer discloses a walking cane that includes function enhancing elements, the cane including a sing of a substantially vertical elongated support member having an upper end, a lower end and a longitudinal axis. A handle is complementally positioned about the support member's upper end for selectable radial rotation relative to the longitudinal axis thereof. Forward and rear and downwardly integrally dependent legs rigidly extend from the support member's lower end, the legs each having a body portion and foot portions. The wheels are rotatably secured to each of the foot portions of the forward legs of a base, and friction-enhancing tips are integrally associated with each of the foot portions of the rearward legs of the base.

U.S. Pat. No. 6,158,453 to Nasco discloses a wheel mounted cane secured to extend laterally from a four-wheeled carriage for use in supporting and balancing a user while walking and including an adjustable braking means for the carriage.

While the foregoing patents disclose improvements in the area of walking aids, none of these patents disclose a walking cane that provides the added support of a broader base, but is relatively easy for the user to maneuver, and includes a braking system that is relatively simple to install and actuate.

SUMMARY OF THE INVENTION

There is therefore provided a walking cane, for supporting and balancing a user, and allowing a user to retard forward motion. The walking cane includes a base, having a wheel rotatably coupled thereto. The cane further includes a braking member, coupled to and positioned relatively above the base, having a contact portion that contacts the wheel to retard the wheel's rotation when a threshold downward force is applied to the cane.

BRIEF DESCRIPTION OF THE DRAWINGS

The present invention will be understood more fully from the detailed description given below and from the accompanying drawings of the preferred embodiment of the invention, which, however, should not be taken to limit to the invention, but are for explanation and understanding only.

FIG. 2 is a broken top view of an embodiment of the braking member according to the present invention.

DETAILED DESCRIPTION OF THE PREFERRED EMBODIMENT(S)

Figure 1:
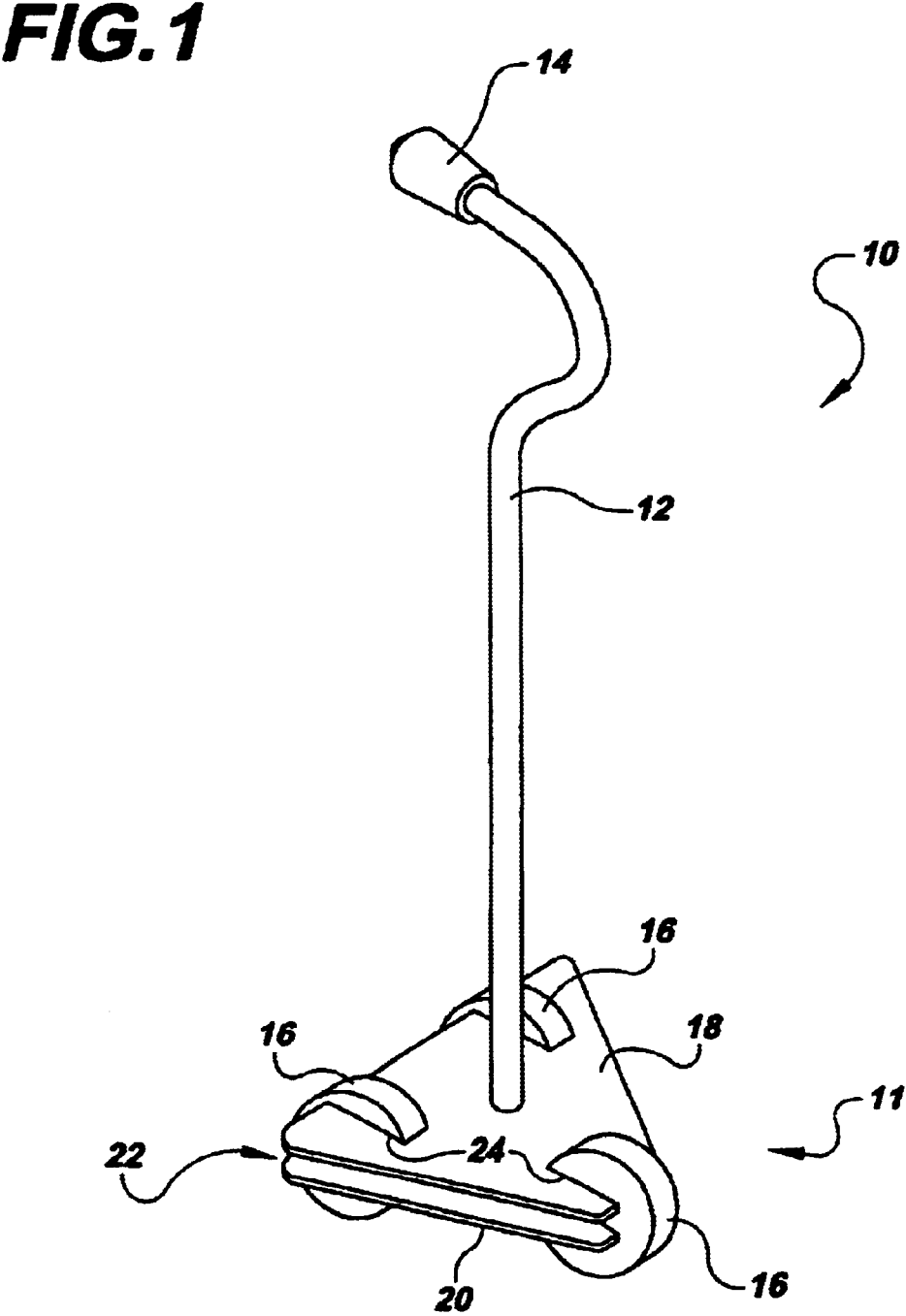
FIG. 1 is an oblique elevational perspective view of an embodiment of a braking cane according to the present invention.

Referring generally to FIG. 1, there is shown an embodiment of a walking cane 10 according to the present invention. The walking cane 10 consists of an elongate shaft 12, which has at one end a handle portion 14. At the other end, the shaft 12 is coupled to a support base 11. The support base 11 consists of a base member 20 and a braking member 18. One or more wheels 16 is rotatably coupled to the base member 20. The base member 20 and braking member 18 are two substantially triangular plates. The braking member 18 is positioned above the base member 20, creating a space 22. In this embodiment, three wheels 16 are coupled to the base member 20 at approximately the three corners of the triangle.

FIG. 2 depicts a more detailed view of the wheel 16, base member 20 and braking member 18 in one embodiment of the present invention. The base member 20, seen in FIG. 2, has a base notch 13. The wheel 16 is rotatably coupled to the base member 20 by an axle 26. However, it is noted that other means of rotatably coupling the wheel 16 to the base member 20 would be apparent to one skilled in the art.

The base notch 13 extends deep enough into the base member 20 so that the wheel 16 is unobstructed in its rotation by the bottom edge 34 of the base notch 13 or any part of the base member 20. The braking member 18 is positioned approximately above the base member 20 and also has a brake notch 24 that is not as deep as the base notch 13. The side wall 38 of the base member 20 and the side wall 21 of the braking member 18 are also shown.

Figure 3A:
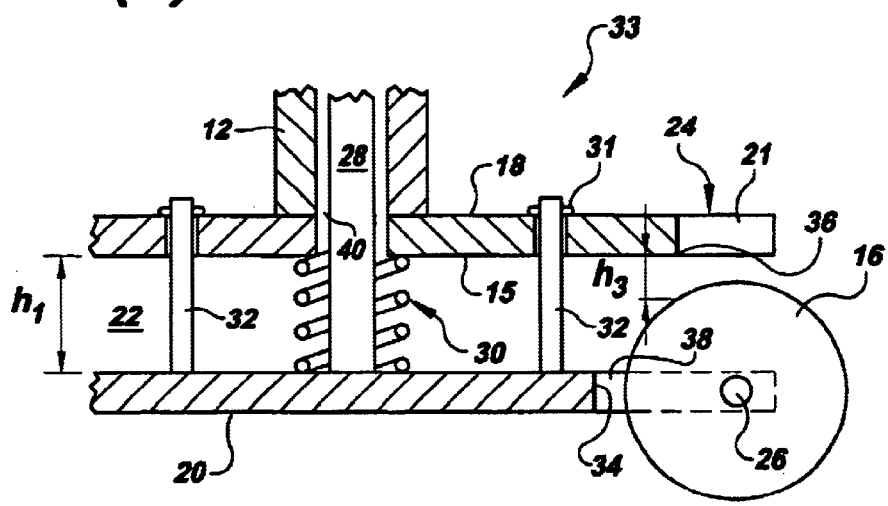
FIG. 3(a) is a side sectional view taken along 3—3 in FIG. 2.

FIGS. 3(a) and (b) show in greater detail the braking system 33 according to the present invention. As is evident from the drawings, the braking member 18 has a first position (FIG. 3(a)) and a second position (FIG. 3(b)). In the first position, braking member 18 is held at a height $h_1$ above the base member 20 by a resilient member, illustrated as a spring 30. It is noted that while in this first position, there is a space, designated by height $h_3$, located between the contact portion 36 of the brake notch 24 and the surface of the wheel 16.

Figure 3B:
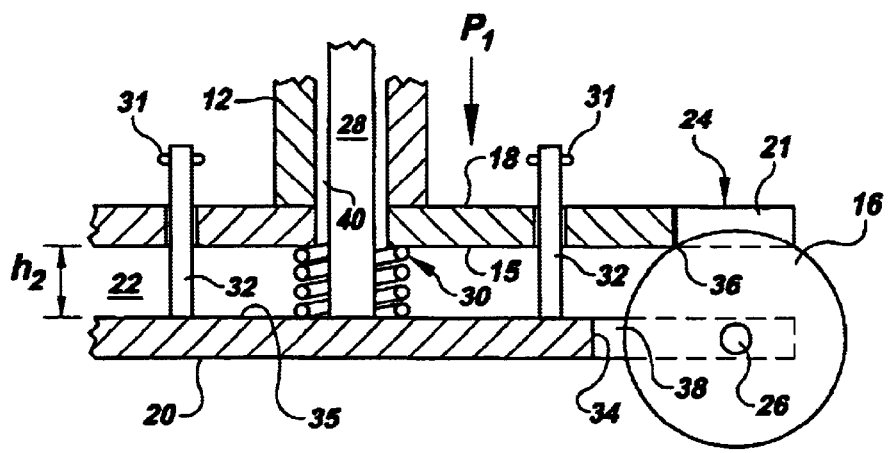
FIG. 3(b) is a side sectional view taken along 3—3 in FIG. 2.

When a threshold amount of pressure $P_1$ is applied to the elongate shaft 12, this force is translated down the shaft 12 to the braking member 18. The bottom surface 15 of the braking member 18 then compresses the spring 30, as shown in FIG. 3(b), until the braking member 18 is at a height $h_2$ relative to the base member 20 and $h_3$ goes to zero. This compression also results in the contact point 36 contacting the surface of the wheel 16, thus retarding the rotation of the wheel 16.

Once the threshold amount of pressure is no longer applied, the spring 30 will recoil to its original, non-braking position (FIG. 3(a)), and the braking member 18 will return to its height, $h_1$, relative to the base member 20.

In FIGS. 3(a) and (b), a shaft stabilizer 28 is shown coupled to the base member 20 and extending, through a hole 40 in the braking member 18, into the elongate shaft 12. Optional rod stabilizers 32, coupled to the base member 20, are also shown in FIGS. 3(a) and (b). The stabilizers 28, 32 can be used to hold the individual components of the walking cane 10 together. For example, in the embodiment shown in FIGS. 3(a) and (b), the braking member 18 is coupled to the elongate shaft 12. The braking member 18 is also slidably coupled to the base member 20 through the rod stabilizers 32. The rod stabilizers 32 are coupled on one end to the base member 20. On the other end, the stabilizers 32 may have a retainer 31 that prevents them from becoming disengaged from the braking member 18. Both the rod stabilizers 32 and the shaft stabilizers 28 can be used separately or in conjunction with each other.

In the embodiment shown in FIGS. 3(a) and (b), the shaft stabilizer 28 is coupled at one end to the base member 20. The other end is slidably engaged with the elongate shaft 12. In this manner the shaft stabilizer 28 helps prevent lateral movement of the braking member 18 relative to the base member 20. Additionally, the shaft stabilizer 28 provides a surface around which the spring 30 is wound.

These two types of stabilizers are given only as examples, and numerous other ways of coupling the braking member 18, base member 20 and elongate shaft 12 would be apparent to one skilled in the art. For example, a resilient member, such as a spring 30, could be coupled to the top surface 35 of the base member 20 and the bottom surface 15 of the braking member 18.

Variations of the Invention

It is noted that FIG. 1 depicts the walking cane 10 of the present invention as having three wheels 16. However, any number of wheels 16, as would be practicable, could be used in connection with the present invention. For example, in one embodiment, the walking cane has only one wheel.

It is also noted that, rather than having a triangular configuration, the base member 20 and braking member 18 could utilize any shape as would be practicable. For example, the base member 20 could be square, rectangular, non-symmetrical, oval or circular. Moreover, the base member 20 and braking member 18 are not required to be the same shape. For example, the base member 20 could be square and the braking member 18 circular so long as the notches 24 and contact points 36 were positioned according to the configuration of the wheels 16.

In another embodiment of the present invention, more than one wheel 16 is coupled to the base member 20, but not all the wheels 16 are braked. For example, the base member 20 may have five wheels 16, but only one of the wheels 16 is braked by the mechanism depicted in FIGS. 3(a) and (b).

It is also noted that the threshold pressure may vary from cane to cane. For example, depending on the weight of the user, it may be desirable to utilize a spring 30 that will compress under a relatively low amount of pressure. Alternatively, it may be desirable to utilize a spring 30 that is highly resistant to compression. The spring's resistance to compression may also be adjustable (e.g. the spring can be wound to a desired tightness, thus resulting in a particular resistance to compression).

It is also noted that other means, beside a spring 30, may be used as the resilient member. For example, a gas-filled piston may be used to maintain the braking member 18 in a non-braking position until a threshold pressure is applied to the braking member 18. Compressible synthetic materials, such as rubber may also be used as the resilient member.

It is also noted that, while the resilient member 30 is shown wound around the shaft stabilizer 28 in FIGS. 3(a) and (b), the resilient member 30 could, in fact, be located any place between the base member 20 and braking member 18. For example, referring to FIGS. 3(a) and (b), the resilient member 30 could be a spring wound around the rod stabilizer 32. The resilient member 30 could also be independent of any vertically oriented piece. For example, the resilient member 30 could be a spring coupled to the bottom surface 15 of the braking member 18 and the top surface 35 of the base member 20.

In FIGS. 1–3(b), the contact portion 36 is shown as being an edge of the brake notch. However, the contact portion can be any portion of the braking member that is capable of contacting the wheel to retard rotation. For example, in one embodiment, the braking member does not have a notch. Rather, while in its first position, the braking member is situated entirely above the wheel. When the threshold amount of pressure is applied, the braking member is directed downward until it contacts the wheel, thus retarding the wheel's rotation.

Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the principles and concepts set forth herein.

What is claimed is:

1. A walking cane, for supporting and balancing a user, and allowing a user to brake forward motion, comprising:
    a) a base, having a wheel rotatably coupled thereto;
    b) a braking member, coupled to and positioned relatively above the base, having:
        i) a contact portion wherein the contact portion is an edge of a notch;
        ii) a first non-braking position, where the contact portion is not in contact with the wheel; and
        iii) a second braking position, where at least a portion of the braking member is lower in height than the first non-braking position, at least a portion of the wheel extending upwardly through the notch, and where the contact portion is in contact with the wheel;
    c) an elongate shaft, coupled to the braking member and the base, and designed to support and balance the user; and
    d) a resilient member, positioned between the base and the braking member, that is:
        i) designed to maintain the braking member in the first, non-braking position when a threshold amount of pressure is not exceeded; and
        ii) designed to allow a second braking position, when the threshold amount of pressure is exceeded on the braking member, that places the braking member in contact with the wheel.

2. The walking cane of claim 1, wherein the resilient member is a spring.

3. The walking cane of claim 1, wherein the braking member is substantially a triangle in shape.

4. The walking cane of claim 3, wherein the notch is at a corner of the triangle.

5. The walking cane of claim 4, further comprising a second and third notch at a second and third corner of the triangle respectively.

6. The walking cane of claim 1, wherein the base is substantially a triangle in shape.

7. The walking cane of claim 6, wherein the wheel is coupled to the base at a corner of the triangle.

8. The walking cane of claim 7, further comprising a second and third wheel coupled to the base at a second and third corner of the triangle respectively.

9. The walking cane of claim 1, further comprising a handle portion on an end of the elongate shaft opposite the coupling to the braking member.

10. The walking cane of claim 1, further comprising a stabilizer, coupled to the base, and designed to substantially prevent lateral movement of the braking member relative to the base.

11. The walking cane of claim 10, wherein the stabilizer includes a first member extending through a first stabilizer hole in the braking member and into a hollow portion of the elongate shaft.

12. The walking cane of claim 11, wherein the stabilizer is a rod.

13. The walking cane of claim 10, wherein the stabilizer includes a second members extending through a second stabilizer hole in the braking member, that is adjacent to the coupling of the elongate shaft.

14. The walking cane of claim 1, wherein the base is a plate.

15. The walking cane of claim 1, wherein the braking member is a plate.

16. A walking cane, for supporting and balancing a user, and allowing a user to brake forward motion, comprising:
   a) a base, having a wheel rotatably coupled thereto, wherein the base is substantially a triangle in shape, and the wheel is coupled to the base at a corner of the triangle;
   b) a braking member, coupled to and positioned relatively above the base, having:
      i) a contact portion being edge of a notch;
      ii) a first non-braking position, where the contact portion is not in contact with the wheel; and
      iii) a second braking position, where at least a portion of the braking member is lower in height than the first non-braking position, at least a portion of the wheel extending upwardly through the notch, and where the contact portion is in contact with the wheel;
   c) an elongate shaft, coupled to the braking member and the base, and designed to support and balance the user; and
   d) a resilient member, positioned between the base and the braking member, that is:
      i) designed to maintain the braking member in the first, non-braking position when a threshold amount of pressure is not exceeded; and
      ii) designed to allow a second braking position, when the threshold amount of pressure is exceeded on the braking member, that places the braking member in contact with the wheel.

17. The walking cane of claim 16, further comprising a second and third wheel coupled to the base at a second and third corner of the triangle respectively.

18. A walking cane, for supporting and balancing a user, and allowing a user to brake forward motion, comprising:
   a) a base, having a wheel rotatably coupled thereto;
   b) a braking member, coupled to and positioned relatively above the base, having:
      i) a contact portion;
      ii) a first non-braking postion, where the contact portion is not in contact with the wheel; and
      iii) a second braking position, where at least a portion of the braking member is lower in height than the first non-braking position and where the contact portion is in contact with the wheel;
   c) an elongate shaft, coupled to the braking member and the base, and designed to support and balance the user;
   d) a resilient member, positioned between the base and the braking member, that is:
      i) designed to maintain the braking member in the first, non-braking position when a threshold amount of pressure is not exceeded; and
      ii) designed to allow a second braking position, when the threshold amount of pressure is exceeded on the braking member, that places the braking member in contact with the wheel; and
   e) a stabilizer, coupled to the base, and designed to substantially prevent lateral movement of the braking member relative to the base, wherein the stabilizer includes a first member extending through a first stabilizer hole in the braking member and into a hollow portion of the elongate shaft.

19. The walking cane of claim 18, wherein the stabilizer is a rod.

20. The walking cane of claim 18, wherein the stabilizer includes a second member extending through a second stabilizer hole in the braking member, that is adjacent to the coupling of the elongate shaft.

* * * * *